Aug. 14, 1962   N. J. ANDERSON   3,049,666
METHOD AND APPARATUS FOR MEASUREMENT OF DYNAMIC
DISSIPATION AND RELATED FACTORS
Filed Jan. 31, 1958   2 Sheets-Sheet 1

INVENTOR
Norman J. Anderson
BY
Morgan, Finnegan, Durham & Pine
ATTORNEYS

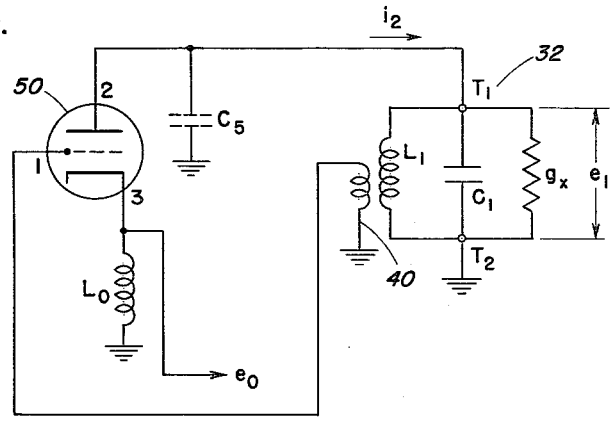

3,049,666
Patented Aug. 14, 1962

3,049,666
METHOD AND APPARATUS FOR MEASUREMENT OF DYNAMIC DISSIPATION AND RELATED FACTORS
Norman J. Anderson 152 Fairview Ave., Boonton, N.J.
Filed Jan. 31, 1958, Ser. No. 712,573
22 Claims. (Cl. 324—57)

This invention relates to electronic measuring instruments and more particularly to instruments which measure dissipative factors such as the dynamic resistance (or conductance) and dissipation factor D (or quality Q) associated with resistive and reactive elements and networks. The invention is also concerned with the method for making such measurements.

The invention consists in the novel parts, constructions, arrangements, combinations and improvements herein shown and described.

The measurement of dynamic resistance has been a long and continued concern of the electrical and electronic art. Such measurement is useful in evaluating components and circuits since the losses associated with components such as inductors and capacitors are a measure of their qualities and performance characteristics.

A logical extension of the evaluation of components and networks per se is the evaluation of factors which affect the dynamic resistance of such elements. Thus a measurement of the dissipative component of a capacitor yields information which is useful in determining the properties of the dielectric. Similarly, geometric factors which influence dynamic resistance can be evaluated, with the latter providing criteria for determining size, shape and other information.

One specific application of this technique is related to the measurement of such external conditions as moisture content and temperature. These factors are measured in terms of their effect on the dielectric of a capacitor. The measurement of the dynamic resistance of the capacitor provides an indication of moisture content, temperature and other related variables.

There are various circuit parameters which are related to dynamic resistance. There is the dynamic resistance associated with an inductor which can be viewed as a series resistance or shunt conductance. A similar situation prevails in connection with capacitance. Dynamic resistance is also influential in the Q factor (or its reciprocal, D dissipation factor) of components and networks, these factors describing ratios involving susceptance and conductance where the latter is the shunt equivalent of series dynamic resistance. Expressions termed "Loss Tangent," "Phase Defect Angles" and "Loss Angle" are also related to dynamic resistance. A relative dynamic conductance can also be characterized as "Loss Factor"; it describes the product of permittivity and Loss Tangent.

While the measurement of dynamic resistance and consequential measurement of factors affecting dynamic resistance have great theoretical possibilities, considerable inconveniences have been encountered particularly at radio frequencies. An RF bridge is sometimes used but generally requires two null adjustments and a correction of the D factor or Q factor, the correction involving a frequency or frequency-squared term. The so-called RX meter measures conductance by two null adjustments and can handle only a very limited amount of shunting susceptance. There are other measuring instruments including a phase detector system which segregates the Z and θ components and indicates them separately as deviations from a reference impedance. Such devices are generally limited to sub-radio frequencies, are quite complex, and depend for their accuracy on the stability of a multitude of circuit elements. Besides requiring a plurality of adjustments and extensive calibration these instruments are additionally burdened by the need on many occasions for extensive interpretation of the instrument indications. In addition standards must frequently be employed and periodically checked to insure accuracy of operation. One major limitation which is applicable to substantially all dynamic-resistance measuring devices is a narrow operating range. This limitation results from the complexity of the measuring circuit and the dependence on a number of components for achieving desired accuracy.

It is therefore one object of this invention to provide a method and apparatus for the measurement of dynamic resistance and dissipation factor which does not require any manual tuning or adjustment and which provides accurate measurement over a wide range of conductance and susceptance.

It is a further object of this invention to provide a method and apparatus for accurately determining dynamic resistance, dissipation factor and related parameters with an accuracy which is dependent on a minimum number of circuit elements.

It is a further object of this invention to provide a method and apparatus for indicating the measured dynamic resistance and dissipation factor instantaneously and directly so as to facilitate the measurement of these and related factors notwithstanding their continual variation.

It is still another object of this invention to provide continuous indication of the measured dynamic resistance and relative parameters so as to provide means for exercising continuous control and/or recording.

Another object of the invention is to provide a method and apparatus for measuring dissipation parameters at various frequencies.

Other objects and advantages of the invention will be set forth in part hereinafter and in part will be obvious herefrom or may be learned by practice with the invention, the same being realized and attained by means of the instrumentalities and combinations pointed out in the appended claims.

In the illustrations:

FIG. 4 is a schematic diagram disclosing certain details of FIGS. 1, 2 and 3 and also disclosing an alternate output arrangement and self-oscillatory feature.

FIG. 5 is a schematic diagram illustrating one embodiment of the invention in which a pentode is utilized.

Figure 1:
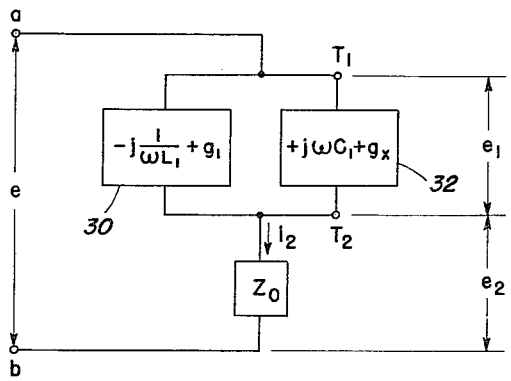
FIG. 1 is a schematic diagram illustrating the central measuring circuit of the invention.

By way of illustration of the principles of the invention reference may be had to FIG. 1.

FIGURE 1 is designed to disclose the general configuration of the basic sensing circuit of the device. A parallel circuit comprising the elements 30 and 32 is connected in series with an impedance $Z_0$ and energized from an alternating sinusoidal source, $e$, via terminals $a$ and $b$. For illustration element 30 is shown to have an admittance containing the parallel combination of conductance $G_1$ and susceptance $-j/wL_1$ while element 32 has the admittance $jwc_1+g_x$. Either element 30 or 32 could represent a part or all of the component or network to be measured. For illustration element 32 is shown as the external subject impedance which is connected to the circuit at terminals $T_1$ and $T_2$. In actual application $g_x$ of element 32 might represent a material, for example a textile or insulation, whose dissipative component is to be measured by placing it in juxtaposition with $C_1$ so as to form the dielectric thereof. This technique is followed in view of the practical requirement that the dielectric be properly subjected to an alternating field. A capacitor by virtue of its simple accessible configuration serves this function well. It is of course possible and practical in some cases to retain the capacitor as part of the testing circuit and measure a purely dissipative component by connecting it across the parallel-tuned circuit.

Returning again to the circuit of FIGURE 1 it is apparent that if the frequency of the applied sinusoid $e$ corresponds to the antiresonant frequency of the parallel circuit then the circuit will behave as if it were a simple conductance equal to $g_1+g_x$. By accounting for $g_1$ through calibration or other means, $g_x$ can be determined. To facilitate the description of pertinent relationships it will be assumed that $g_1$ is negligible or is lumped with $g_x$.

Measurement of the conductance $g_x$ is accomplished in substance by measuring the current $i_2$ flowing out of the parallel-tuned circuit. By holding voltage $e_1$ appearing across the tank circuit at a constant value, $i_2$ will yield data sufficient to determine $g_x$ and will also be sufficient to measure the dissipation factor D of element 32. The actual measurement of current $i_2$ is accomplished by measuring the voltage drop, $e_2$, which it produces across $Z_0$.

To understand the procedure described above, reference may be had to FIGURE 2 which is generally identical to FIGURE 1 and also includes specific components.

At the resonant radian frequency, $w_r$, of the parallel-tuned circuit, where $$w_r^2 = \frac{1}{L_1 C_1} \quad (1)$$

the relationships $$i_1 = e_1 g_x \quad (2)$$

and $$e_2 = w_r L_0 i_2 \quad (3)$$

prevail. Since $i_1 = i_2$ then from (2) and (3), $$e_2 = w_r L_0 e_1 g_x \quad (4)$$

The operations embodied in Expressions 1 through 4 indicate, as previously mentioned, that the value of $i_2$ and therefore $e_2$ is a measure of the dissipative conductance $g_x$. Note from Expression 4 that while there are two constants which can be readily accounted for by calibration there exists in addition the variable frequency term $w_r$. Isolation of this variable can be accomplished by a slight change in the circuitry which will be described hereinafter. At this point however it is useful to note that the dissipation factor D can be determined notwithstanding $e_2$ depends on $w_r$.

Since the dissipation factor D is determined by the relationship $$D = \frac{g_x}{w_r C_1} \quad (5)$$

then by combining (4) and (5) so as to eliminate $g_x$, the relationship $$e_2 = e_1 \frac{L_0}{L_1} D$$

or $$D = \frac{e_2 L_1}{e_1 L_0} \quad (6)$$

is disclosed.

D is now determinable from a knowledge of $e_2$ since the remaining terms on the right are constants. This is a nice and useful result since D is determined independent of $C_1$ and is directly indicated in terms of $e_2$. By controlling a suitably calibrated indicator with $e_2$, a direct reading D meter is realized. A further feature of the circuit lies in the fact that D, often a function of frequency, can be evaluated at any frequency by the simple expedient of tuning $L_1$ and $L_0$ so that their ratio remains constant. The variation of $L_1$ produces a new antiresonant frequency, to which the frequency of the applied voltage $e$ is adjusted, so that the parallel-tuned circuit is in a new antiresonant condition. Maintaining the ratio $L_1/L_0$ constant insures the applicability of Expression 6.

It was mentioned above that while the conductance $g_x$ could not be directly evaluated in terms of the voltage $e_2$ without accounting for the variable frequency term $w_r$ (see Expression 4), this condition could be changed by a slight modification of the circuitry.

Figure 2:
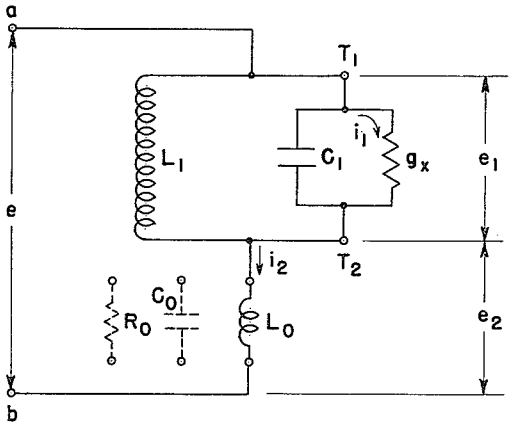
FIG. 2 is a schematic diagram disclosing one arrangement of components of the central measuring circuit.

To make the indication of $g_x$ dependent on the single variable $e_2$ and thus provide a direct indication, it is only necessary to replace $L_0$ of FIG. 2 by a resistance $R_0$, shown for illustration in dashed lines. With $R_0$ in place of $L_0$, then:

$$e_2 = R_0 i_2 \quad (7)$$

but $$i_2 = i_1 = e_1 g_x$$

Thus $$e_2 = R_0 e_1 g_x$$

or $$g_x = \frac{e_2}{R_0 e_1} \quad (8)$$

Since $e_1$ and $R_0$ are constants by definition and assumption, dynamic conductance $g_x$ is directly related to the value of voltage $e_2$. Further, this direct measure of $g_x$ is independent of the value of $C_1$. Insofar as measurement of $g_x$ at different frequencies is concerned it is noted from Expression 8 that only a single element, $L_1$, need be turned.

A capacitor, $C_0$, is shown in FIGURE 2. If this capacitor is substituted for $R_0$ an additional set of relationships can be derived. Thus:

$$e_2 = \frac{1}{w_r C_0} i_2 \quad (9)$$

Since $$i_2 = i_1 = e_1 g_x \quad (10)$$

then, $$e_2 = e_1 \frac{g_x}{w_r C_0} \quad (11)$$

From these relationships an expression for loss factor, $D\epsilon$, can be derived which discloses that $D\epsilon$ can be measured by measurement of voltage $e_2$.

To see this note that $$D\epsilon = \frac{g_x}{w_r C_{10}} \quad (12)$$

where $$C_{10} = \frac{C_1}{\epsilon} \quad (13)$$

$C_{10}$ is the capacity of $C_1$ for a permittivity of unit. In other words $C_{10}$ is the capacity of $C_1$ with the dielectric material of loss $g_x$ removed. If (11) is rewritten and multiplied by $C_{10}/C_{10}$:

$$e_2 = \frac{e_1 g_x}{w_r C_0} \cdot \frac{C_{10}}{C_{10}} \quad (14)$$

then in view of (12) and (13)

$$D\epsilon = e_2 \frac{C_0}{e_1 C_{10}} \quad (15)$$

Expression 15 establishes the fact that by holding the ratio $C_0/C_{10}$ and $e_1$ constant then $e_2$ is a direct measure, independent of $e$, of loss factor $D\epsilon$. This function was derived by replacing resistance $R_0$ with a capacitance $C_0$.

The foregoing description has indicated that $e_2$ may be made to indicate various factors related to the qualities of the dielectric including dissipation factor D, dynamic conductance $g_x$ and loss factor $D\epsilon$ by utilizing inductance $(L_0)$, resistance $(R_0)$ or capacitance $(C_0)$ in the output branch of the circuit. It is equally clear that combinations of reactance and resistance may be employed so that outputs may be derived which are related to combined dissipation characteristics. Thus a combination of resistance and inductance can be utilized to obtain an output responsive to any proportion of dissipation conductance $g_x$ and dissipation factor D. It is also noted that instead of a simple L, R or C, equivalent frequency responsive networks can be utilized. $L_0$ for example can be replaced by a resistance $R_0$ with the voltage drop $e_2$ across $R_0$ used to drive a frequency selective network whose transfer function is similar to that of $L_0$. In this case the voltage $e_2$ across the resistance is indicative of dynamic conductance, $g_x$. The output of the frequency selective network however is proportional to dissipation factor D.

In the preceding discussion it has been assumed that a sinusoidal voltage, $e$, has been avaliable for the purpose of energizing the tuned circuit. Moreover it was necessary that the frequency of this voltage be adjusted to coincide with the resonant frequency of the tuned circuit.

Figure 3:
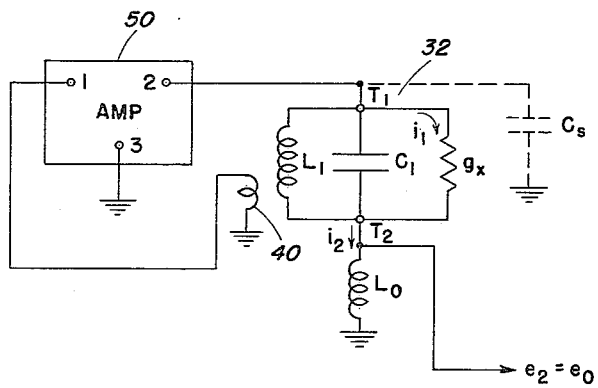
FIG. 3 is a schematic diagram illustrating one central measuring circuit in combination with an oscillator.

In FIGURE 3 there is disclosed the signal circuit of an amplifier 50 which in combination with a feedback network comprising winding 40 and the tuned circuit 32, forms an oscillator whose frequency is automatically adjusted in accordance with the values of $L_1$ and $C_1$. Also influencing the frequency of oscillation is inductor $L_0$ but its effect can be nullified by a change in circuitry described hereinafter.

The circuit of FIGURE 3 serves to provide an excitation voltage for tuned circuit 32. Automatic frequency change in the presence of changes in $L_1$ and $C_1$ is also accomplished so that the frequency of the excitation voltage continually corresponds to the resonant frequency of the tuned circuit. The automatic frequency function of FIGURE 3 would be relatively uncomplicated were it not for the presence of inductance $L_0$ and in addition stray contaminating reactances such as those involving wiring capacity. The elimination of these complications will be described below:

The effect of stray reactance can be analyzed by considering as an example shunt capacitance $C_s$ shown in FIG. 4. With $C_s$ present the oscillator will adjust itself to a frequency $w_0$ where $$w_0^2 = \frac{1}{L_1(C_1 + C_s)}$$

If this condition prevails, the tuned circuit will not be at resonance and hence current $i_2$ will have a reactive component. Since elimination of contaminating reactances is virtually impossible it is best to admit their presence but eliminate their effects. To this end current $i_2$ is ignored for measurement purposes and a different current is sensed—a current which has substantially no reactive component; i.e., one that flows through the entire tuned circuit comprising circuit 32 and the contaminating reactances. The current flowing out of terminal 2 of amplifier 50 would fit this description if the contaminating reactance were sensibly external to this terminal. Since this is not the case the current flowing through terminal 3 can be considered. This current is appropriate if no current flows through terminal 1. If terminal 1 is the control grid of amplifier 50 and if no grid current flows, as in class A operation, this condition is satisfied. Terminal 3 is thus selected as the point of measurement. For this measurement $L_0$ is placed in the cathode circuit of amplifier 50. The voltage drop $e_0$ is utilized as a measure of the dissipation factor D.

The remaining elements of FIGURE 4 correspond to those in FIGURE 3. A feedback path to terminal 1 from tuned circuit 32 via winding 40 provides the necessary oscillatory mode. The very desirable automatic tuning operation is thus achieved.

It is worthy of new emphasis at this point that although $g_x$ has been associated with a capacitor it is equally suitable in many applications to measure a conductance $g_x$ which has no reactive counterpart or to measure a $g_x$ which is associated with inductance. In one case the tuned circuit $L_1$, $C_1$, $C_s$ is loaded at terminals $T_1$ and $T_2$ by an external dissipative component $g_x$. In the second case a circuit comprising $C_1$ is loaded by the external combination of $L_x$ and $g_x$. In this latter case a feedback network is placed in the capacitive branch. Many well-known configurations employing this technique suffice.

In measuring the dissipation of inductance the techniques described with reference to capacitance are applicable with the exception that the functions of $C_0$ and $L_0$ are interchanged. Thus to measure the D factor of the combination $L_x$, $g_x$, a capacitor $C_0$ would be employed.

To carry the measurement an additional step: it is desirable in certain applications to measure the dissipation characteristics of components or networks which have combined inductance, capacitance and resistance. This measurement is readily accomplished with the circuits disclosed above. To the terminals $T_1$ and $T_2$ can be added such elements, and, provided the reactances do not drive the oscillator 50 out of its operating range, the circuit will function as described and provide measurement of the unknown conductance $g_x$.

In connection with the circuit of FIG. 4 it should also be noted that, for maximum accuracy, the oscillator distortion should be maintained at a minimum to avoid harmonic components in the current $i_2$. As a final observation, note that the effect of $L_0$ in the cathode circuit has been ignored and the method for achieving a constant voltage $e_1$ has not been described. These considerations will be taken up below in connection with FIGURE 5.

Appearing in FIGURE 5 is a circuit somewhat similar to FIGURE 4. Vacuum tube 50 has been replaced however with a pentode 10. The pentode is in some respects superior. Its higher internal impedance provides a higher Q in the oscillatory mode. The output inductor $L_0$ of FIGURE 4 has been replaced by resistor $R_0$ in FIGURE 5 to eliminate the detuning effect caused by phase shifts resulting from $L_0$. The function $L_0$ is simulated by selecting an appropriate frequency-sensitive network in function selector 11. The selector is driven by output voltage, $e_0$, and drives in turn a meter drive circuit 13 to provide, on indicator 25, a reading related to dissipation factor D. To measure loss factor another appropriate network is switched into the circuit of the function selector. To indicate conductance, $g_x$, the networks in function selector 11 may be bypassed. If a weighted combination of dissipation data is desired additional networks may be included in the Selector.

If it is required that the measured dissipative characteristic be automatically controlled, the arrangement embodying comparator 21 and control system 29 is applicable. The output of the meter drive circuit, 13, or any equivalent output from the system, is fed to comparator 21 where it is compared with a signal representing the desired value of dissipation. A discrepancy produces an output from the comparator which is used to actuate control system 29 and thereby provide appropriate correction.

Also included in FIGURE 5 is an AVC system 16 which regulates the oscillator so as to provide the condition, heretofore assumed, of a constant voltage $e_1$ across the tuned circuit. FIGURE 5 shows a typical but not exclusive arrangement for AVC. Variations in output appearing at plate 24 of pentode 10 are sensed by the AVC circuit 16 via terminal $a$. The AVC circuit operates with reference voltage $E_r$ applied at terminal $b$ via resistor $R_2$ and supply B. The sensed variations produce an output at terminal $c$ which is applied to suppressor grid 26 in such a manner as to offset the tendency of the plate voltage to vary, thus maintaining a substantially constant voltage across the tuned circuit in accordance with the requirements previously described. Attainment of the AVC function is facilitated by employing pentode 10, instead of the triode 50, of FIGURE 4.

In addition to maintaining a constant voltage across the tuned circuit in the presence of component change, tube drift and the like, the AVC circuit can be utilized in lieu of, or in conjunction with, the function selector 11 to provide a measurement of any one or combination of the dissipative characteristics. The AVC circuit can be readily modified to provide a variation in its control signal which varies in accordance with an appropriate function of frequency so that $e_0$ provides an indication of conductance $g_x$, dissipation factor D, loss factor, $D\epsilon$, or a combination of these factors. One typical modification is accomplished by inserting a frequency-responsive network in lead 1 of FIG. 5. In this mode of operation the AVC circuit permits a controlled variation in the voltage $e_1$ thus causing $e_0$ to vary with frequency in the same manner that would prevail if a frequency-sensitive element ($L_0$ or $C_0$) or network were used in the output circuit. A simulation of the above technique can be accomplished by utilizing an AVC circuit whose regulation is relatively poor. In this event a change in capacitance, $C_1$, for example, causes $e_1$ to change thereby producing a corresponding variation in $e_0$. This is tantamount to utilizing the frequency-sensitive networks described above. This latter system provides a usable but somewhat inferior measurement.

The remaining elements of FIG. 5 have been described in reference to FIG. 4 with the exception of screen 22, which is supplied from B+ via $R_1$ and is decoupled to the cathode via $C_2$.

It should be realized that the foregoing description of the invention is explanatory and exemplary and that departures therefrom may be made without departing from the principles and spirit thereof. Thus transistors, electronic reactances, duals and other equivalent components may be substituted to achieve the objectives and functions described hereinbefore.

What is claimed is:

1. A method of measuring dissipation and related factors of electrical impedance comprising the steps of combining said impedance with other impedance means to form a parallel tuned circuit having a resonant frequency, energizing said tuned circuit with a sinusoidal energizing signal of known amplitude at said resonant frequency, and while maintaining said resonance, measuring the response of impedance means to the external sinusoidal resonant current flowing into said tuned circuit.

2. A method of measuring the dissipation factor D of electrical impedance comprising the steps of combining said impedance with other impedance means to form a parallel-tuned circuit, energizing said tuned circuit with a resonant sinusoidal voltage, controlling said voltage to maintain a substantially constant amplitude of same notwithstanding changes in said electrical impedance, and while maintaining said resonance, measuring the voltage drop across inductive means energized by the external sinusoidal current flowing into said tuned circuit.

3. A method of measuring the loss factor $D\epsilon$ of electrical impedance comprising the steps of combining said impedance with other impedance means to form a parallel-tuned circuit, energizing said tuned circuit with a resonant sinusoidal voltage, controlling said voltage to maintain a substantially constant amplitude of same notwithstanding changes in said electrical impedance, and while maintaining said resonance, measuring the voltage drop across capacitive means energized by the external sinusoidal current flowing into said tuned circuit.

4. A method of measuring dissipation and related factors of electrical impedance comprising the steps of combining said impedance with other impedance means to form a parallel tuned circuit having a resonant frequency, continuously controlling the frequency of an electrical power source by said impedance to operate at said resonant frequency, energizing said tuned circuit with a signal derived from said source, and measuring the resonant sinusoidal current flowing into said parallel tuned circuit.

5. A method according to claim 4, in which said other impedance means include stray reactances.

6. A method according to claim 4, in which said impedance is variable, said tuned circuit accordingly has a variable resonant frequency and said frequency of said source is thus variably controlled to operate at said variable resonant frequency.

7. A method according to claim 4, in which said measuring step comprises the actuation of inductive means by said sinusoidal resonant current and the measurement of the resultant signal produced by said inductive means to thereby obtain an indication of dissipation factor D.

8. A method according to claim 4, in which said measuring step comprises the actuation of capacitive means by said sinusoidal resonant current and the measurement of the resultant signal produced by said capacitive means to thereby obtain an indication of loss factor, $D\epsilon$.

9. A method according to claim 4, in which said measuring step comprises the actuation of resistive means by said sinusoidal resonant current and the measurement of the resultant signal produced by said resistive means to thereby obtain an indication of dynamic conductance $g$.

10. A method of measuring dissipation and related factors of variable electrical impedance comprising the steps of combining said impedance with reactive means to form a parallel-tuned circuit having a variable resonant frequency, continuously controlling the frequency of an electrical power source by said impedance to conform with the value of said resonant frequency, energizing said impedance with a resonant frequency voltage of substantially constant amplitude derived from said source, energizing another impedance in accordance with the sinusoidal current flowing into said tuned circuit, and measuring the voltage resulting from said energization of said other impedance.

11. A method according to claim 10, in which said other impedance comprises resistive means thereby providing an indication of dynamic conductance.

12. A method according to claim 10, in which said other impedance comprises inductive means thereby providing an indication of dissipation factor D.

13. A method according to claim 10, in which said other impedance comprises capacitive means thereby providing an indication of loss factor $D\epsilon$.

14. An electronic system for measuring dissipation and related factors of an object comprising impedance means including terminals adapted to be connected to said object, said impedance means also including reactance adapted in combination with said object to form a parallel tuned circuit having a resonant frequency, a source of sinusoidal power, said tuned circuit being energized by a known voltage from said source, frequency adjusting means interconnecting said source and said tuned circuit for maintaining the frequency of said source at a value conforming substantially to said resonant frequency and means responsive to the external sinusoidal resonant current flowing into said tuned circuit for indicating said dissipation and related factors.

15. An electronic system according to claim 14, in which said source of sinusoidal power includes amplifying means and said interconnecting means comprise a feedback circuit interconnecting said amplifying means and said tuned circuit.

16. An electronic system according to claim 14, in which said source includes an electron tube having a control grid, an anode and a cathode, said tuned circuit being energized from said anode, and said interconnecting means being coupled to said control grid and said tuned circuit.

17. An electronic system according to claim 14, in which said source includes amplifying means having a plurality of electrodes, said tuned circuit being coupled to one of said electrodes, said interconnecting means being coupled to another of said electrodes and to said tuned circuit, and said indicating means being connected to a third electrode of said amplifying means.

18. An electronic system according to claim 14, in which control means are provided for controlling said objects, said control means being responsive to said signals.

19. An electronic system for measuring a dissipative characteristic of impedance means comprising a substantially known amplitude, sinusoidal voltage source, reactance means adapted for connection with said impedance means to form a parallel tuned circuit energized from said source, said source including automatic frequency adjusting means responsive to said tuned circuit for maintaining said tuned circuit in a condition of resonance, and measuring means responsive to the external resonant current flowing into said tank for measuring said dissipative characteristic, said measuring means having a measuring impedance selected according to the particular dissipative factor to be measured.

20. A system according to claim 19 in which said measuring impedance is of resistive character for measurement of dynamic conductance $g$, of inductive character for measurement of dissipative factor D and of capacitive character for measurement of loss factor, $D_\epsilon$.

21. A system according to claim 19 wherein said impedance means is a normally non-oscillating reactance and in which said reactance means comprise the conjugate of said reactance.

22. A system according to claim 19 in which said reactance means includes stray reactance.

References Cited in the file of this patent

UNITED STATES PATENTS

| | | |
|---|---|---|
| 2,111,235 | Avins | Mar. 15, 1938 |
| 2,448,581 | Fair | Sept. 7, 1948 |
| 2,463,616 | Harrison | Mar. 8, 1949 |
| 2,617,856 | Erwin | Nov. 11, 1952 |
| 2,617,859 | Kraft | Nov. 11, 1952 |
| 2,636,928 | Bernard | Apr. 28, 1953 |
| 2,852,739 | Hansen | Sept. 16, 1958 |

FOREIGN PATENTS

| | | |
|---|---|---|
| 634,577 | Great Britain | Mar. 22, 1950 |

OTHER REFERENCES

Prichard et al.: "Crystal Impedance Meters Replace Test Set" Electronics, May 1953; pages 176–180.

Johnstone: "Inductance and Dynamic Resistance Meter," Wireless World, August 1954; pages 377–381.

UNITED STATES PATENT OFFICE
CERTIFICATE OF CORRECTION

Patent No. 3,049,666                        August 14, 1963

Norman J. Anderson

It is hereby certified that error appears in the above numbered patent requiring correction and that the said Letters Patent should read as corrected below.

Column 4, line 29, for "turned" read -- tuned --; line 52, for "unit" read -- unity --; lines 57 and 58, in equation (14), after "$e_2$" insert an equal sign; same column 4, lines 60 and 61 in equation (15), for "$e_z$" read -- $e_2$ --.

Signed and sealed this 31st day of March 1964.

(SEAL)
Attest:
ERNEST W. SWIDER

Attesting Officer

EDWARD J. BRENNER

Commissioner of Patents